April 21, 1953 R. M. DUNGAN ET AL 2,635,835
BALLOON AND METHOD OF INFLATING SAME
Filed Dec. 13, 1951 3 Sheets-Sheet 1

INVENTORS
RAYMOND M. DUNGAN
RAYMOND I. HAKOMAKI
BY William C. Strieber ATTORNEY

April 21, 1953 R. M. DUNGAN ET AL 2,635,835
BALLOON AND METHOD OF INFLATING SAME
Filed Dec. 13, 1951 3 Sheets-Sheet 2
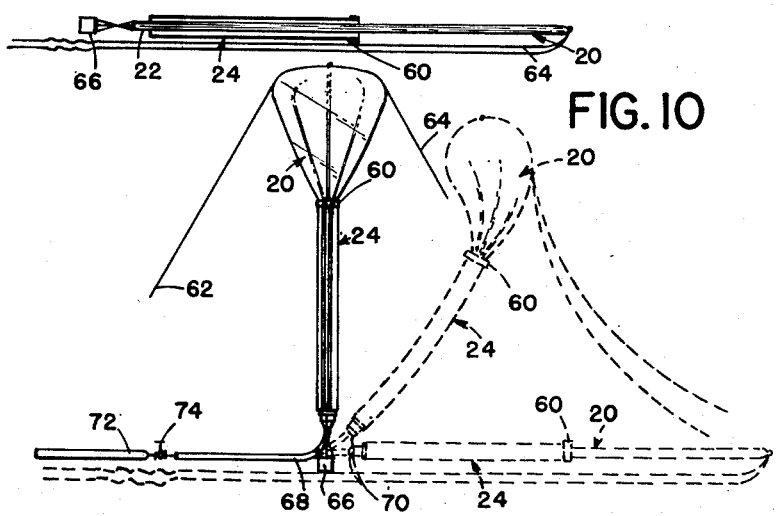
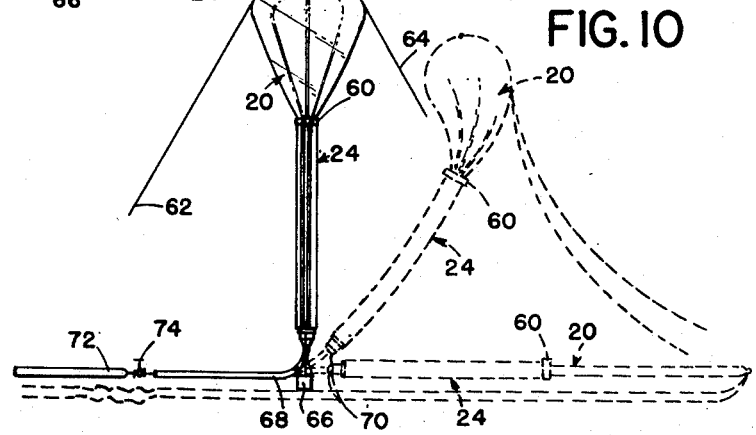
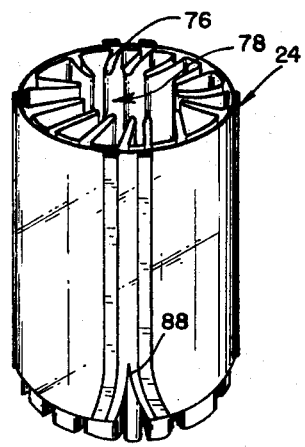
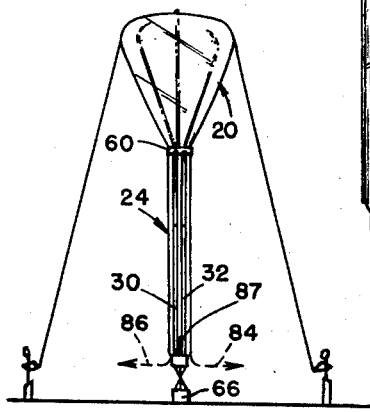
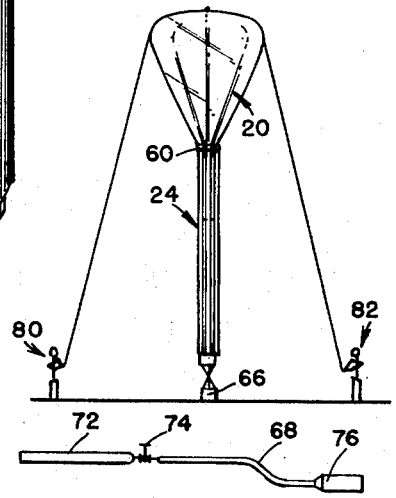
*INVENTORS*
RAYMOND M. DUNGAN
RAYMOND I. HAKOMAKI
BY William C. Strieber
ATTORNEY April 21, 1953 R. M. DUNGAN ET AL 2,635,835
BALLOON AND METHOD OF INFLATING SAME
Filed Dec. 13, 1951 3 Sheets-Sheet 3

INVENTORS
RAYMOND M. DUNGAN
RAYMOND I. HAKOMAKI
BY William C. Strieber ATTORNEY

Patented Apr. 21, 1953

2,635,835

UNITED STATES PATENT OFFICE 2,635,835

BALLOON AND METHOD OF INFLATING SAME

Raymond M. Dungan and Raymond I. Hakomaki, Minneapolis, Minn., assignors to General Mills, Inc., a corporation of Delaware Application December 13, 1951, Serial No. 261,556

14 Claims. (Cl. 244—31)

This invention relates to an improved method of inflating balloons and of handling balloons during inflation.

Balloons which are capable of carrying heavy loads and which are capable of ascending to the stratosphere must be very large. The material of these balloons before inflation is very bulky and difficult to handle. In stratosphere balloons, the balloons are only partially inflated at ground level because the lifting gas will expand greatly as the balloons ascend to the very low pressure of the stratosphere. This requires that the balloons be inflated with a relatively small bubble of gas which should be positioned at the upper end of the balloon for ascent. Since the gas to inflate the balloon is inserted into the balloon at the lower end, it is difficult in the beginning steps of inflation to get the gas to pass through the folds of balloon material toward the upper end of the balloon. The balloon at the beginning of inflation is usually lying on the ground and the gas must pass from the lower end through a considerable length of balloon to get to the upper end of the balloon. In ordinary inflation the gas will catch in pockets in the folds and billow intermediate parts of the balloon. These pockets of gas lift material along the entire length of the balloon rather than passing to the top end of the balloon to lift the top and suspend the material for continuing inflation.

Various ways have been adopted to get the gas to pass from the lower opening to the upper end of the balloon. One method has included the placing of an inflation tube within the balloon which protrudes from the lower end and extends through the interior of the balloon to the upper end. Thus the lifting gas is confined within the tube until it gets to the upper end.

In another method the gas may be worked toward the top forcing the pockets of gas along the folds of the balloon. These methods are often unsatisfactory in requiring extra time and equipment.

After the gas is in the top of the balloon the top rises and lifts the remaining material with it. Because of the extreme length of the balloon and because only a small amount of gas is inflated into the balloon, the folds of the lower portion of the balloon hang loosely and the balloon still presents an unwieldy large surface. Wind and even breezes such as may be encountered on a normal day, catch in the folds, whipping and twisting the balloon making it difficult to continue inflation and to keep the balloon safely anchored. This interference caused by the wind catching at the lower folds also makes it difficult to weigh the lift of the balloon while being inflated. The greatest difficulty is experienced by having the balloon present a large "sail" area which develops tremendous forces in the rigging which may overstress the members.

Accordingly, an object of the invention is to provide a method for inflating a balloon which will eliminate the necessity of providing an inflation tube within the balloon and will enable the inflation of the balloon at the bottom end and insure that the gas will pass quickly to the upper end of the balloon.

Another object of the invention is to provide a method of inflating the balloon which will eliminate the hazard and difficulties encountered by the wind catching in the folds of the balloon as it is freely suspended in a vertical position during inflation by the bubble of gas at the upper end.

Another object of the invention is to provide a method of launching a balloon in which the lower uninflated end is enclosed in a sleeve which holds the balloon folds tightly together forming a passageway for the gas which is inflated into the balloon and presenting a smooth surface which offers little wind resistance.

Another object is to provide a sleeve for enclosing the lower folds of a balloon which may be quickly and easily removed from the balloon just before launching.

Another object of the invention is to provide a method of reinforcing the sleeve which surrounds the lower end of the partially inflated balloon so that the lateral tension due to the gas within the balloon will not tear the upper end of the sleeve.

Other objects and advantages will become apparent in the following specification taken in connection with the accompanying drawings in which Figure 1 is a perspective view of material which may be used for the sleeve to enclose the lower end of the balloon;

Fig. 9 is an elevational view showing the sleeve in position over the lower end of the balloon before inflation;

Fig. 10 is a front elevation of the balloon showing its positions as it is inflated with a lifting gas;

Fig. 11 is a front elevational view showing the balloon fully inflated;

Fig. 12 is a perspective view showing a section through the balloon illustrating how the folds of the balloon are packed within the sleeve and illustrating the cut which is formed in the bottom of the sleeve to start the tearing;

Fig. 13 is a front elevational view showing the balloon just before removal of the sleeve;

As is shown in Figs. 9 and 10 the present invention involves the use of a balloon of the type which may be used in high altitude flights. The balloon has an upper portion 20 in which a pocket of gas is located before the balloon is launched. Since in high altitude flights the gas greatly expands, only a portion of the balloon can be filled with gas before launching and this small amount of gas expands to fill the balloon as it ascends to maximum flying altitudes.

Figure 16:
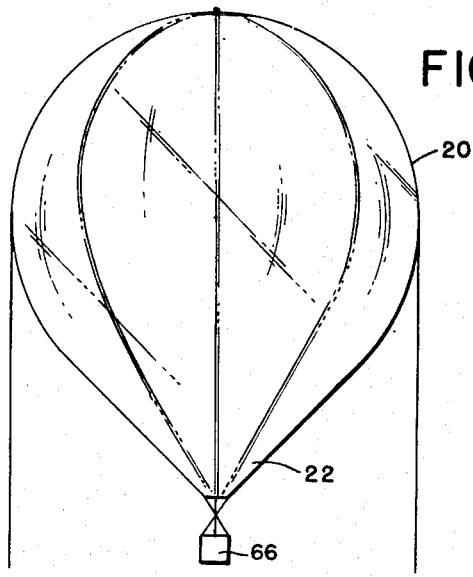
Fig. 16 illustrates the balloon after it has attained a high altitude and the gas has expanded to fully inflate the balloon.

A balloon of a type which may be used with the present invention is shown in Fig. 16 at this flying altitude fully expanded with the upper part 20 being spherical in shape and the lower part 22 being conical in shape. In practicing the method of the present invention this lower portion 22 is enclosed within a tubular shaped sleeve 24 during inflation, as shown in Figs. 9 and 10.

Figure 1:
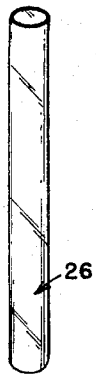
Figure 3:
Fig. 3 is an elevational view illustrating the manner of applying longitudinal strips of tape to the sleeve.

Referring now to Fig. 1, the material for forming the sleeve is shown as a length of tubular material 26.

Figure 2:
Fig. 2 is a detailed view of the upper end of the sleeve illustrating the method in which a tape is applied to the upper end for reinforcement.
Figure 4:
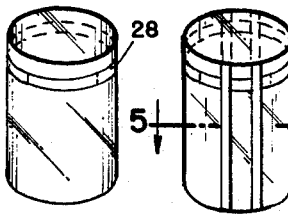
Fig. 4 is a detailed view of the upper end of the sleeve showing the relative position of the tapes.

A section of strengthening tape 28 is wrapped circumferentially around the upper end of the tube spaced a short distance from the top as is illustrated in Fig. 2.

Figure 5:
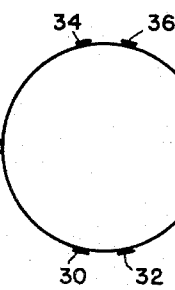
Fig. 5 is a sectional view taken along lines 5—5 of Fig. 4 and illustrating the position of the tapes on the sleeve.

A pair of closely spaced parallel strips of tape 30 and 32 are next attached to run longitudinally the length of the sleeve of tubular material. A similar pair of strips of tape 34 and 36, as shown in Fig. 5, are attached to the sleeve diametrically opposite the first pair. These strips of tape which may be called tear-guide strips function to guide the tear which is formed in the sleeve and keep the tear between them when the sleeve is ripped from the balloon. Additional tapes 38 and 40 may be attached longitudinally on either side of the sleeve being positioned between the pairs of tear-guide strips. These strips of tape 38 and 40 lend strength to the sleeve and prevent it from being ripped in other locations when lateral pull is applied to the sleeve to tear it from the balloon. The sleeve is uniquely reinforced at the top to prevent its being accidentally split when the balloon is inflated.

Figure 6:
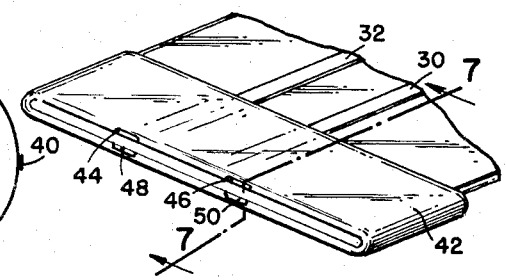
Fig. 6 is a perspective view of the upper end of the sleeve showing the method of doubling over the sleeve to strengthen it.

The upper end of the balloon sleeve is doubled back several times as is illustrated in Fig. 6. The doubling back forms a cuff 42 at the upper end of the sleeve which greatly enhances its strength and encloses the band of tape 28 so it will in no way abrasively rub against the balloon. Slits 44 and 46 are next cut in the upper edge of the cuff being located between the inner surface of the cuff and sleeve and beside the tear guide tapes. These slits are of a sufficient width to permit passing tape therethrough. Similar slits 48 and 50 are cut on the other side of the cuff also positioned beside the pair of tear-guide tapes.

Figure 7:
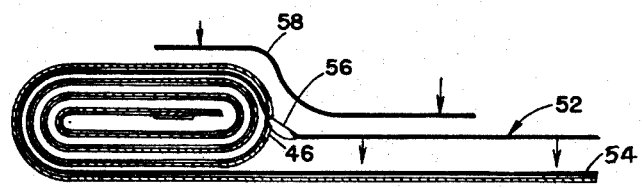
Fig. 7 is a sectional view taken along lines 7—7 of Fig. 6 and having taping added to illustrate the position in which the taping is placed.
Figure 8:
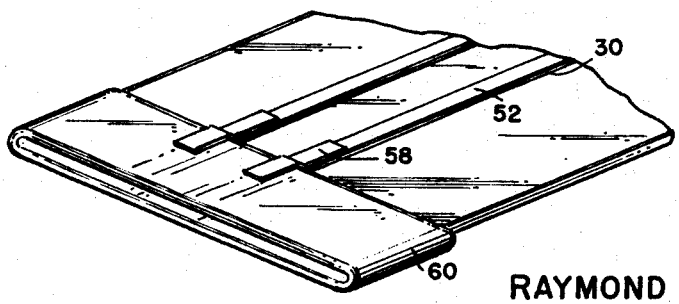
Fig. 8 is a perspective view of the upper end of the tube with taping to retain the fold in position.

Through these slits, as indicated in Fig. 7, is passed a length of tape 52 and one end 54 of the tape 52 is attached to the side of the sleeve over the tear guide tape 30. After the tape 52 has been passed through the opening 46, the cuff is once more folded back thus bringing the slit 46 around against the sleeve. The tape is then given a half twist at 56, where it emerges from the slot, to turn the adhesive side of the tape against the sleeve. This end of the tape is then also secured to the sleeve over the other end 54. The tape thus functions to hold the cuff flat at the top of the sleeve. It will be noticed that the tape lies entirely within the folds of the cuff at the end of the sleeve and none of it is exposed. This is of importance as any exposure of the sharp backing of the tape may cause a cutting action, or any exposure of an adhesive portion of the tape acts as an abrasive and may tear a hole in the thin balloon material when the sleeve is in position on the balloon. To cover any adhesive portion which may be exposed at the half turn 56, an additional short piece of tape 58 is placed over the half turn. The tapes may all be placed to overlie each other. That is, the tape 52 may be placed over the tear-guide tape 30 and the end of tape 58 to be placed over tape 52. The product thus finished is shown in Fig. 8 with a reinforcing collar 60 at the end of the sleeve.

The finished sleeve is drawn over the lower end 22 of the balloon leaving the upper end 20, which is to be inflated, free from the sleeve 24. If it is desired, the sleeve may be placed on the balloon when it is manufactured rather than sliding it on before the balloon is flown. Another manner of attaching the sleeve would be to wrap a flat sheet around the lower end of the balloon and join the eges to form a sleeve enclosing the balloon.

The anchoring or shroud lines 62 and 64 can be attached to the top of the balloon to steady the bubble while the balloon is being inflated. Attached to the lower end of the balloon by suitable lines is a load 66.

As is shown in Fig. 10, to inflate the balloon a gas inflating hose or pipe 68 is inserted into the lower end 70. The inflation hose 68 leads from a cylinder 72 filled with lifting gas, the release of which is controlled by valve 74. The end of the inflation pipe may be fitted with a diffuser 76 such as is shown generally in Fig. 11.

As the balloon is lying on the ground, as is shown in the dotted line horizontal position of Fig. 10, gas is admitted into the lower end. The gas passes up through the passageway between the material confined in the sleeve 24 and passes up into the upper end 20 of the balloon. A balloon inflation tube may be used with the sleeve, although with the present sleeve, need for provision of such a tube is eliminated. The balloon inflation tube referred to, is a long tube which extends within the balloon to lead the gas from the lower end up to the tip so that it will not gather in the folds of the lower end of the balloon. With the sleeve confining the folds it will be seen that the passageway left between the folds is relatively small and the gas inserted at the lower end will be channeled therethrough to pass into the upper end. The sleeve 24 confines the folds 76 of the lower end of the balloon within it in the manner shown in a detailed view of Fig. 12, leaving a central passageway 78 for the gas.

As soon as a small amount of gas has been inflated into the upper end of the balloon the lifting ability of the gas will begin to raise the balloon up, as is shown in the inclined dotted position of Fig. 10. Further inflation raises the lower longitudinal section 22 of the balloon, which is enclosed by the sleeve, to a vertical position such as shown by the solid line position of Fig. 10. As additional gas is inserted into the balloon the upper end 20 becomes fully inflated and somewhat rounded as is shown in Figs. 10 through 13.

It will be seen that sufficient balloon material is left above the top of the sleeve to accommodate the amount of gas which must be inflated into the balloon. The upper exposed end is well filled and exerts a lateral force against the upper end of the sleeve. The end, strengthened by the collar, is capable of bearing this strain without tearing. The rolled collar also presents a rounded edge to the balloon wall which will not cut into the balloon material.

The lift of the balloon is partially balanced by the load 66. The balloon has aditional lift, necessary to give the balloon the unbalancing force to carry it upward. The handling lines 62 and 64 serve to balance this additional lift and steady the "bubble" when exposed to wind forces which may set up lateral oscillatory motions. This is done by having people 80 and 82 apply gentle corrective forces in a resilient manner. This should be done manually as indicated by the figures of people shown at 80 and 82, since fixed lines may damage the balloon.

As shown in Fig. 12, the folds of the lower end of the balloon are held encased within the sleeve. This lower end may be of considerable length. For example, in very high altitude balloons such as are capable of ascending to 100,000 feet and more, the total length of the balloon may be approximately one hundred thirty feet, the upper inflated end being 40 feet long the remaining 90 feet of the lower end is encased in the sleeve. It will readily be seen that even with a slight breeze which may be encountered on a relatively calm day the wind catching in the folds of the lower end of the balloon will cause considerable billowing of the large sail area which in turn causes twisting and tugging on the balloon making it difficult to continue inflation. This interference with the balloon by the wind would make it impossible to measure the amount of gas if done by weighing and makes the general process of inflation difficult and hazardous because of the added stresses imposed by the wind. With the folds encased within the sleeve a streamlined outer shell is presented to the wind which greatly lowers the air resistance and makes it possible to inflate the balloon without interference from normal air currents.

Just before launching, the encasing sleeve 24 is removed from the balloon by a method which will now be described.

Figure 14:
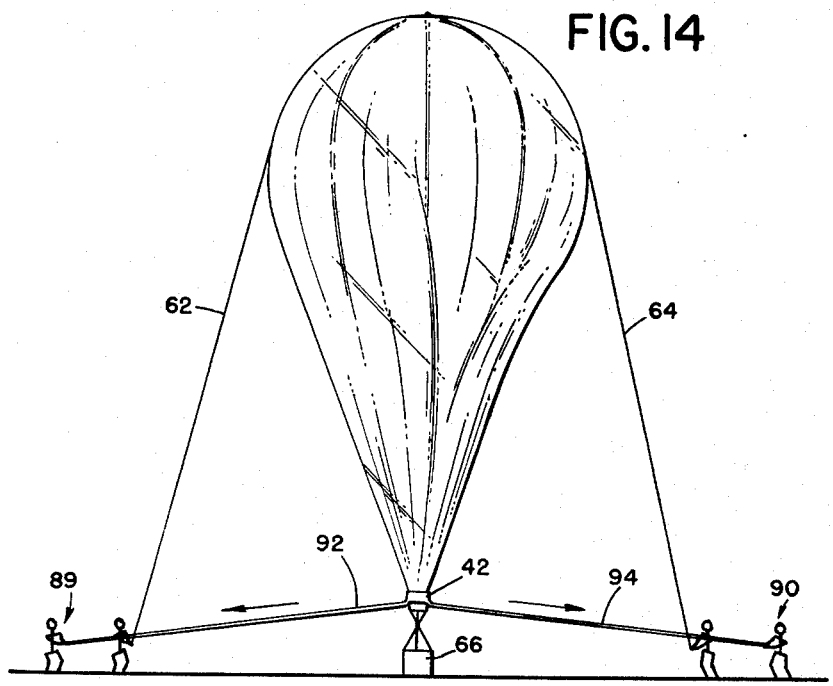
Fig. 14 is a front elevational view showing the sleeve being removed from the balloon just before launching.
Figure 15:
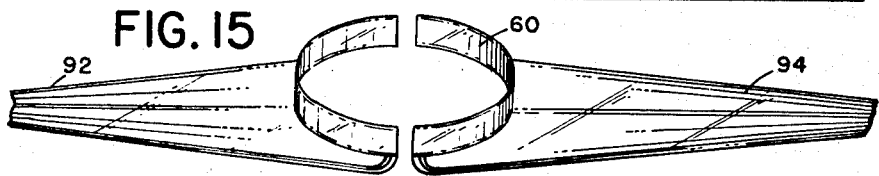
Fig. 15 is an enlarged detail view of the upper end of the sleeve illustrating the separation of the sleeve for removal from the balloon.

Referring to Fig. 13 the sleeve is removed by applying a lateral pull in opposing directions to the bottom of the sleeve. The direction of this pull is indicated by the arrows 84 and 86. This causes the sleeve to tear along the vertical line 87, the tear lines being guided between the tear-guide tapes 30 and 32. A similar tear line will appear on the other side, between tapes 34 and 36. In order to help start the tear at the bottom, initial cuts or slits 88, Fig. 12, may be cut from the bottom edge of the sleeve. It will thus be seen that as the sleeve is pulled apart laterally the cuts will start tears which will extend vertically. The lateral tension may be applied by two men each grasping a side of the lower end of the sleeve and moving away from the balloon. As they pull the torn ends away from the balloon the sleeve slides downwardly off the balloon as indicated in Fig. 14. The figures at 89 and 90 represent men who are shown pulling the split sleeve outwardly. This is continued until the sleeve is torn completely from the balloon to free it. The collar cannot be torn because of the circumferential strengthening tapes. The separation of the collar may be accomplished by cutting it as is indicated by the view of Fig. 15 thus completely separating the two sections 92 and 94 of the sleeve. With the balloon thus free of the sleeve, the guy lines 62 and 64 are cut as short as possible and the balloon released to carry its load 66 aloft.

The sleeve is preferably left on the balloon till the time of launching so that the wind cannot catch in the free folds of the lower end. As soon as the sleeve is removed, the balloon is freed to ascend. As the balloon ascends into the stratosphere the gas expands to completely inflate the balloon as illustrated by the showing of Fig. 16.

Thus it will be seen that we have provided a method of inflating a balloon which accomplishes the object set forth above. The method enables the easy inflation of a balloon without the provision of a special inflation tube and insures that the gas inflated into the lower end of the balloon will pass to the upper end.

The primary purpose and accomplishment of the sleeve is to prevent the following action which results when the wind catches the loose lower folds of the balloon and causes a sail to be formed. The sail formed is inherently unstable since the upper portion is held at one point which is movable as contrasted to a boat sail which is held in open position by a boom. Thus the balloon may rotate sufficiently to present the smaller side area to the wind. This will reduce the horizontal force and the balloon will move towards the wind. This motion will accent or augment the rotational motion which precipitated this action and cause severe twisting and buffeting of the balloon. These difficulties are obviated by the use of the sleeve and by the method taught by the present invention.

The sleeve is simple and easy to make and can be made of relatively inexpensive dispensible material, such as for example, lightweight polyethylene. It will be understood that sleeves of various types of material may be used and also that the method of practicing the invention is not to be limited to using the sleeve of this particular design. For example, the reinforcing in the tear-guide tapes may be placed on the sleeve in various patterns and the reinforcing collar at the end of a balloon may be formed in various ways or it may be found feasible in some uses to omit these elements. It may also be found on some occasions that other means for removing the sleeve from the balloon may be suitable and the invention is not restricted to the preferred method shown.

We have, in the drawings and specification, presented a detailed disclosure of the preferred embodiment of our invention, but it is to be understood that as the invention is susceptible of modifications, structural changes and various applications of use within the spirit and scope of the invention, we do not intend to limit the invention to the specific form disclosed but intend to cover all modifications, changes and alternative constructions and methods falling within the scope of the principles taught by our invention.

We claim as our invention:

1. The method of inflating a balloon which comprises placing a sleeve over the lower portion of the balloon to restrain the folds, and inserting a gas nozzle into the lower end to inflate the balloon, the gas passing freely through the folds of the section of balloon which is restrained by the sleeve and collecting in the upper portion.

2. The method of inflating a balloon which comprises encasing the lower body of the balloon in a tubular sleeve, inflating the balloon by inserting a lifting gas into the lower end to pass through the sleeve-enclosed portion to the upper end, the balloon being free to rise to vertical position as it is being inflated, and subsequently removing the sleeve from the balloon before it is released.

3. The method of inflating a balloon which comprises enclosing a lower portion of the balloon material in a sleeve, inflating the balloon by passing a lifting gas into the balloon through the sleeve-enclosed material, and removing the sleeve before launching by exerting opposite lateral forces on the lower end to create vertical tears in the sleeve material and draw the untorn material downwardly off the balloon.

4. The method of inflating a balloon which comprises drawing a tubular sleeve over the lower portion of the balloon to confine the folds of the material therein, inflating the balloon by inserting a lifting gas through the sleeve-confined section of the balloon, and removing the sleeve before launching by forming opposing vertical slits at the bottom and applying a lateral pull to the sections between the slits to tear the sleeve from the balloon.

5. A balloon having the upper end inflated with a lifting gas and a lower portion which will become inflated as the balloon ascends to high altitudes enclosed by a tubular sleeve of material capable of being torn from the balloon, and a reinforcing means at the top of the sleeve preventing the sleeve from being separated by the lateral pressure exerted by the upper end of the balloon which is filled with lifting gas.

6. A balloon having an upper portion inflated with a lifting gas and a lower portion enclosed by a tubular sleeve which is formed of material capable of being ripped from the balloon, and a strip of reinforcing material extending circumferentially around the upper end of the sleeve to sustain the lateral force the balloon exerts on the upper end of the sleeve.

7. A balloon having an upper portion filled with a lifting gas and the lower portion enclosed by a tubular sleeve and being formed of material capable of being torn to remove it from the baloon, and pairs of tear-guide strips extending longitudinally the length of the sleeve and attached to each side of the sleeve to guide the tearing lines of separation along the sleeve when it is ripped and removed from the balloon before launching.

8. A balloon having an upper portion filled with a lifting gas and the lower portion enclosed by a tubular sleeve formed of material capable of being torn to remove it from the balloon, pairs of tear-guide strips extending longitudinally and attached to each side of the sleeve the length of the sleeve to guide the line of tear along the sleeve when it is torn from the balloon before launching, and strengthening strips attached to the sleeve between the pairs of guide strips to strengthen the sleeve material for rapid tearing.

9. A balloon having an upper portion filled with a lifting gas and the lower portion within a tubular sleeve of material capable of being torn from the balloon, and a pair of tear-guide strips on each side of the sleeve extending longitudinally to guide the lines of tear longitudinally along the balloon material, the top portion of the sleeve being doubled on itself a plurality of times to add lateral strength and present a rounded edge to the balloon.

10. The method of reinforcing the end of a length of tubular material for surrounding the lower end of a balloon which has the upper end inflated, the method comprising doubling the material on itself a plurality of times, and taping the doubled end against the sleeve so that the tape will not contact the balloon.

11. The method of reinforcing the upper end of a length of tubular material for surrounding the lower end of a balloon which has the upper end inflated, the method comprising doubling the material on itself a plurality of times, forming an opening at the upper edge of the doubled material, passing a length of tape through the opening and adhering one end thereof to the outside of the tube, doubling the material back over the balloon once more, and giving the tape a half twist so that the adhesive side will face the sleeve and attaching the tape to hold the double fold in its folded position without tape contacting the balloon.

12. The method of inflating a large balloon envelope with gas for high altitude flights which comprises inserting a lifting gas into the lower open end of the balloon to fill the upper end of the balloon with a bubble of gas which will expand at higher altitude to fill the entire balloon and permitting the bubble to lift the balloon envelope to a substantially vertical position, placing restraining means over the lower end of the balloon to confine the folds to a small circumference to reduce the area presented to the wind, and removing the restraining means from the vertical balloon just prior to releasing for flight.

13. A balloon for inflation with a lifting gas for high altitude flights comprising a balloon envelope including an upper portion which is to be filled with gas to expand to fully inflate the balloon at high altitudes, and a lower portion with an inflation opening at the lower end, and means to confine the folds of the lower portion of the balloon envelope to a small circumference, the confined lower portion forming the sole passageway for gas inserted at the lower end to pass through the confined folds to inflate the upper end.

14. A balloon for inflation with a lifting gas for high altitude flights comprising a balloon envelope, the upper end to be filled with a lifting gas which will expand to inflate the lower end at high altitudes, an opening at the lower end for admitting gas for inflation, and an inflation sleeve enclosing the lower end of the balloon envelope, one end of the tube terminating substantially at the balloon opening and the other end terminating substantially between the lower and upper end of the balloon so as to confine the folds of the lower end for the passage of gas during inflation and not interfere with the insertion of gas at the lower end or the expansion of the balloon at the upper end as it inflates with gas.

RAYMOND M. DUNGAN.
RAYMOND I. HAKOMAKI.

References Cited in the file of this patent

UNITED STATES PATENTS

| Number | Name | Date |
|---|---|---|
| 1,081,792 | Vaniman | Dec. 16, 1913 |
| 2,415,118 | Walk | Feb. 4, 1947 |